United States Patent
Henzman

(10) Patent No.: US 8,745,891 B2
(45) Date of Patent: Jun. 10, 2014

(54) VACUUM KILN APPARATUS AND METHOD OF USING SAME

(75) Inventor: R. Bruce Henzman, Franklin, IN (US)

(73) Assignee: Greenmaxx, LLC, Franklin, IN (US)

(*) Notice: Subject to any disclaimer, the term of this patent is extended or adjusted under 35 U.S.C. 154(b) by 465 days.

(21) Appl. No.: 12/971,688

(22) Filed: Dec. 17, 2010

(65) Prior Publication Data

US 2011/0146100 A1   Jun. 23, 2011

Related U.S. Application Data

(60) Provisional application No. 61/287,404, filed on Dec. 17, 2009.

(51) Int. Cl.
*F26B 5/04* (2006.01)

(52) U.S. Cl.
USPC .................................................. 34/406; 34/92

(58) Field of Classification Search
USPC ........................................................ 34/406, 92
See application file for complete search history.

(56) References Cited

U.S. PATENT DOCUMENTS

| | | | | |
|---|---|---|---|---|
| 1,390,341 A * | 9/1921 | Cushing | .......................... | 34/413 |
| 2,207,360 A * | 7/1940 | Spellacy | .......................... | 241/61 |
| 3,455,119 A * | 7/1969 | Bright | .............................. | 62/180 |
| 3,673,699 A * | 7/1972 | Buffington | ........................ | 34/66 |
| 3,693,944 A * | 9/1972 | Murphy | ........................ | 366/261 |
| 3,755,918 A * | 9/1973 | Parrot | .............................. | 34/236 |
| 3,779,911 A * | 12/1973 | Freudenthal et al. | .......... | 210/620 |
| 3,937,521 A * | 2/1976 | Reuter | .............................. | 406/25 |
| 4,189,848 A * | 2/1980 | Ko et al. | .......................... | 34/473 |
| 4,914,834 A * | 4/1990 | Sime | ................................ | 34/169 |
| 4,924,601 A * | 5/1990 | Bercaw | .............................. | 34/530 |
| 5,575,083 A * | 11/1996 | Lee et al. | .......................... | 34/255 |
| 6,167,638 B1 * | 1/2001 | Vavro et al. | ...................... | 34/474 |

* cited by examiner

*Primary Examiner* — Kenneth Rinehart
*Assistant Examiner* — Gajanan M Prabhu
(74) *Attorney, Agent, or Firm* — Ladas & Parry LLP

(57) ABSTRACT

A vacuum kiln apparatus and method of using same are disclosed for use in drying corn, other grains, seeds and legumes. The vacuum kiln apparatus can include a support base, a wall, a vacuum pump system, a pressure valve, a top hatch, a machinery access hatch, an anti-overload baffle, a conveyor system, a motor, a chamber vent valve, an air outlet manifold and an air compressor. The wall defines an internal chamber for receiving the grain. The vacuum pump system is used to draw down the pressure within the internal chamber which drives moisture out of the corn while maintaining the integrity of the corn, i.e., drying the corn with little or no cracking. The air outlet manifold along with the air compressor are used to flush high pressure air through the piles of corn to strips off any residual water that may be clinging onto the exterior of the corn grains.

2 Claims, 4 Drawing Sheets

VACUUM KILN APPARATUS AND METHOD OF USING SAME

FIELD OF THE DISCLOSURE

The present invention relates kilns, more particularly to a vacuum kilm for use in reducing residual moisture in grain such as corn or seeds, legumes or other agricultural products that require drying.

BACKGROUND

It is preferable to lower the amount of latent moisture in grains in order to extend their shelf life. Drying grains inhibits molds, such as, *Diplodia, Gibberella, Fusarium, Aspergillus*, and *Alfatoxin* from compromising the integrity of the grains prior to consumption.

Conventional drying methods for treating freshly harvested grains have been to thermally drive latent moisture water out of the grain by burning fossil fuels and even burning discarded construction materials. These forced hot air methods are expensive and waste and require vast amounts of expensive fuels. As a result, conventional drying methods can exhibit very negative effects, such as releasing untold amounts of pollutants/carbons which in turn contribute to global warming. Accordingly, there is a need to dry grains by using a more economical and ecological means.

SUMMARY

The vacuum kiln apparatus and method of using the same, according to the principles of the present invention, overcomes a number of the shortcomings of the prior art by providing a novel vacuum kiln apparatus and method for use in drying corn and other types of grains, seeds and legumes for longer storage life.

This method uses a chamber capable of pulling a vacuum to extract the moisture from grain, legumes, seeds and nuts and uses forced high-pressure air to remove the moisture from the tank. It will also be capable of being insulated/heated if necessary. The vacuum kiln will be preferably made of stainless steel for a long operational usage against the vacuum, but other alloys and coatings may be suitable. The electrical needs are customary for a normal installation of this kind being 240 v single phase.

The vacuum kiln apparatus includes a support base, a wall, a vacuum pump system, a pressure valve, a top hatch, a machinery access hatch, an anti-overload baffle, a conveyor system, a motor, a chamber vent valve, an air outlet manifold and an air compressor. The wall defines an internal chamber for receiving the grain. The vacuum pump system is used to draw down the pressure within the internal chamber which drives moisture out of the corn while maintaining the integrity of the corn, i.e., drying the corn with little or no cracking, no heat damage and less damage due to excess movement. The air outlet manifold along with the air compressor are used to produced a pulse of elevated air pressure that strips off any residual water that may be clinging onto the exterior of the corn. The method of using includes the steps of collecting, closing, detaching, dispensing, elevating, evacuating, forcing, maintaining, measuring, obtaining, opening, removing, repeating, retrieving, testing, turning off, and venting.

The steps in operation for this system are generally as follows. First the media—typically grain, but other crops may be used—are loaded in the chamber while removing any unwanted material using the compressor and the vent in combination. Second the pressure in the chamber is reduced through the use of a vacuum pump. This second step will evaporate the moisture trapped inside the media. Third, moisture level inside the chamber will be monitored until a substantially constant moisture reading is achieved. While the time duration will vary based on volume and type of grain, with a specific moisture level versus time, it is expected that 30 minutes will typically be suitable. Fourth, after the constant moisture reading described is achieved, the vacuum will be released. Extracted moisture will be removed from the chamber with forced air. The foregoing steps two through five can be repeated as necessary until the desired final moisture level achieved. As a final step, after the desired final moisture level is achieved the media may be removed.

There has thus been outlined, rather broadly, certain features of the invention in order that the detailed description thereof that follows may be understood, and in order that the present contribution to the art may be appreciated.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and aspects other than those set forth above will become apparent when consideration is given to the following detailed description thereof. Such description makes reference to the annexed drawings wherein.

The same reference numerals refer to the same parts throughout the various figures.

DETAILED DESCRIPTION

Figure 1B:
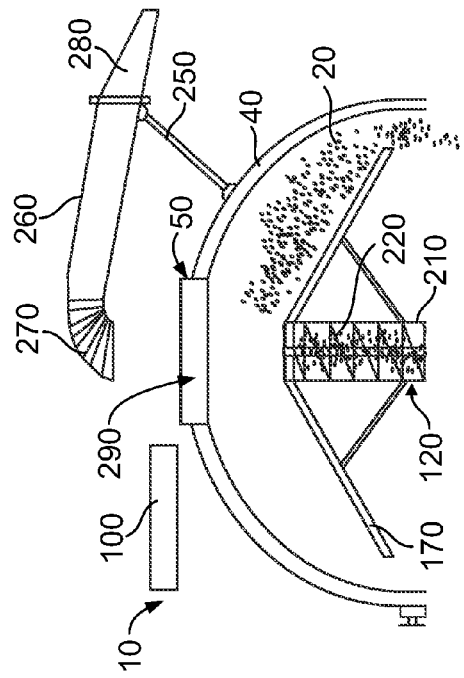
FIG. 1B is a cross sectional side view of the upper portion of the first embodiment of a vertical embodiment of the vacuum kiln apparatus.

The present disclosure will now be described more fully with reference to the accompanying drawings, in which examples of the disclosure are shown. The disclosure may be, however, embodied in many different forms and should not be construed as being limited to these variations as set forth herein; rather, these examples are provided so that this disclosure will be thorough and complete, and will fully convey the concept of the disclosure to those of ordinary skill in the art.

The drawings are not necessarily to scale and in some instances proportions may have been exaggerated in order to more clearly depict certain features of the disclosure. Further, it should be understood that, although various steps of various the disclosed methods may be shown and described as being in a sequence or temporal order, the steps of any such method are not necessarily limited to being carried out in any particular sequence or order, absent an indication otherwise. That is, the method steps are to be considered to be capable of being carried out in any sequential combination or permutation order while still falling within the scope of the present disclosure.

Various features described herein can be combined in various embodiment of the vacuum kiln apparatus 10. The apparatus has a support base 30, a wall 40, a vacuum pump system 80, a pressure valve 90, a top hatch 100, a machinery access hatch, a conveyor system 120, a bottom array 130, a motor 140, a chamber vent valve 150, and an air compressor 160. The wall 40 is attached to the support base 30 in which the wall 40 has a top access opening 50 and a machinery access opening 60 such that the wall 40 defines an internal chamber 70. The vacuum pump system 80 is in communication with the internal chamber 70. The pressure valve 90 is in communications with the internal chamber 70. The top hatch 100 is attached to the wall 40 in which the top hatch 100 is configured to hermetically seal the top access opening 50 of the wall 40. The machinery access hatch is attached to the wall 40 in which the machinery access port 110 is configured to hermetically seal the machinery access opening 60 of the wall 40. The conveyor system 120 is mounted within the internal chamber 70. The bottom array 130 is mounted within the internal chamber 70 of the wall 40 such that the bottom array 130 is configured to deliver grain 20 to the conveyor system 120. The motor 140 is coupled to the conveyor system 120 and mounted within the internal chamber 70. The chamber vent valve 150 is in communications with the internal chamber 70. The air compressor 160 is in communications with the internal chamber 70.

The apparatus 10 may additionally comprise a top baffle array 170 mounted within the internal chamber 70 of the wall 40 such that the top baffle array 170 is configured to receive grain 20 from the conveyor system 120.

The apparatus 10 may additionally be fitted with an anti-overload baffle 180, an air outlet manifold 440, and an off-load port 200. The anti-overload baffle 180 is mounted within the internal chamber 70 of the wall 40. The air outlet manifold 440 is mounted within the internal chamber 70 such that the air outlet manifold 440 is coupled to the air compressor 160. The off-load port 200 is attached to the wall 40 such that the off-load access opening 190 can be hermetically sealed at the off-load port 200.

The conveyor system 120 can be any commercially known conveyor system 120 such an Archimedes screw conveyor system 120 comprising a helical screw 210 coupled to the motor 140 and a sheath 220 surrounding the helical screw 210. Another variant of the conveyor is that it is a belt system 230 coupled to the motor 140 in which the belt system 230 may operate in conjunction with a vented platform 240.

In this first vertical embodiment, the apparatus 10 may further comprise a support arm 250, a discharge conduit 260, and a sealing adaptor 290. The support arm 250 is configured to be attached to the wall 40. The discharge conduit 260 preferably comprises an inner end 270 and a chute 280. The sealing adaptor 290 is configured to be coupled to the inner end 270 of the discharge conduit 260 and to the conveyor system 120 for receiving grain 20 from the conveyor system 120, wherein the sealing adaptor 290 is also configured to be mounted to the top access opening 50 of the wall 40.

The apparatus 10, in various embodiments, may also have a drive mechanism 300 that is configured to couple together the motor 140 to the conveyor system 120.

The apparatus 10 may also comprise a heater 310 mounted within the internal chamber 70 of the wall 40.

The wall 40 may be constructed of any commercially known wall 40 configuration as long as it is able to maintain a internal chamber 70 reduced pressure of about one thirtieth of an atmosphere. One preferred variant of the wall 40 is that it comprises: an outer skin 320, a plenum 330, a plenum valve 340 in communications with the plenum 330, an insulative layer 350, and an inner skin 360. The insulative layer 350 and the outer skin 320 define the plenum 330 therebetween. The wall 40 may further comprise: a screen 370 secured to the inner skin 360, and a gap 380 defined between the screen 370 and the inner skin 360.

The insulative layer 350 may be made of any known insulative material such as those selected from the group consisting of polyethylene-polypropylene, polynitrile, polystyrene-polybutadiene, polybutadiene, natural rubber, polychloroprene, polyurethane, polyisocyanurate, polyphenolic, polyvinyl chloride, polyurea-aldehyde, polymelamine-aldehyde, polystyrene, polypropylene, polyethylene, cellulose acetate, polyepoxy, polyacrylonitrile, polysilicone, polyethylene terephthalate, polyurethane, cotton, and fiberglass.

The apparatus 10 may further comprise a control panel 390 which is configured to control the chamber vent valve 150, and the air compressor 160.

The apparatus 10 may also further comprise a humidity detector 400 configured to detect humidity within the internal chamber 70.

The apparatus 10 can be configured to dry grain 20 such as those selected from the group consisting of corn, rice, wheat, oats, barley, quinoa and mixtures thereof. Preferably the grain 20 is corn.

The apparatus 10 may further include a drying unit 410 in communication with the air compressor 160 for reducing the humidity of the ambient air being pressured. The drying unit 410 may charged with active material selected from the group consisting of activated carbon, ammonium chloride, silica, calcium chloride, calcium oxide, calcium sulfate, molecular sieves, zeolites, magnesium sulfate, sodium phosphate di-basic, potassium carbonate, potassium aluminum disulfate, magnesium chloride, diammonium sulfate, sodium nitrate, sodium chloride, potassium bromide, clays and blends of these materials. It is preferable that the bottom array 130 has a plurality of perforations 420.

Vacuum pump system 80, can use vacuum pump 82 connected to chamber 70 through vacuum lines 84. As described, vacuum causes moisture in grain 20 to migrate to the surface of each individual piece. When the selected moisture parameters, also described herein, are met, that surface moisture can be migrated away from the grain 20 using high pressure air through manifold 440 and thereafter. Air passage is enhanced by supporting grain 20 on vented platform 240. The moisture laden higher pressure air can be exhausted from chamber 70 and grain 20 removed through discharge valve or port 262.

The high pressure air is pressurized by compressor 160 through air lines or conduits 442. Solenoid valves 444 at predetermined locations control closing or opening conduits 442 in communication with chamber 70. Venturi conduits 446 can be fitted to high pressure conduits 442 in order to utilize pressurized airflow through conduits 442/446 to impart a relative vacuum to provide increased efficiency in pressure management in chamber 70.

Vertical or horizontal units may be usable for drying grain 20. Horizontal units may have support base 30, a wall 40, a vacuum pump system 80, a pressure valve 90, a top hatch or hatches 100, an off-load port 190, a humidity sensor or detector 400, a conveyor system 120, a bottom array 130, a chamber vent valve 150, an air compressor 160, an anti-overload baffle 180, an air outlet manifold 440 mounted, and a control panel 390. The wall 40 is attached to the support base 30 in which the wall 40 has a top access opening 50, a machinery access opening 60, and an off-load access opening 190 in which the wall 40 defines an internal chamber 70. Perforated vented platform 240 supports the grain 20 permitting air circulation and directing the grain 20 to conveyor 120.

The vacuum pump system 80 can be configured to be in communication with the internal chamber 70 using compressor 82 and vacuum lines 84. A pressure valve 90 is configured to be in communication with the internal chamber 70. The top hatch 100 is attached to the wall 40 such that the top hatch 100 is configured to hermetically seal the top access opening 50 of the wall 40. The machinery access hatch is attached to the wall 40 in which the machinery access port 110 is configured to hermetically seal the machinery access opening 60 of the wall 40. The off-load port 200 is attached to the end wall 40, visible in FIG. 3, in which the off-load port 200 is configured to hermetically seal the off-load access opening 190 of the wall 40. The humidity detector 400 is configured to detect humidity within the internal chamber 70. The motor 140 is mounted within the internal chamber 70. The conveyor system 120 is mounted within the internal chamber 70 such that the conveyor system 120 comprises a belt system 230 coupled to the motor 140. Air circulation through grain 20 is promoted by vented platform 240. The bottom array 130 is mounted within the internal chamber 70 of the wall 40 and the bottom array 130 is configured to deliver grain 20 to the conveyor system 120 and the bottom array 130 has a plurality of perforations 420. The chamber vent valve 150 is configured to be in communications with the internal chamber 70. At the bottom of chamber 70 is located pit cock drain solenoid valve 448 which will enable draining of condensed moisture.

The air compressor 160 is configured to be in communications with the internal chamber 70. The anti-overload baffle 180 is mounted within the internal chamber 70 of the wall 40 and is configured to control a height of the grain 20 on the conveyor system 120. The compressed air manifold 440 is mounted within the internal chamber 70 and manifold 440 is coupled to the air compressor 160 through lines 440 and valves 444 so that a high pressure dose of air in the internal chamber 70 can be provided to enhance displacement out through the chamber 70 of moisture clinging on the surface of the individual grain 20. The control panel 390 is configured to control the chamber vent valve 150 and the air compressor 160.

One preferred embodiment of a method of removing excess moisture in grain 20 to extend a shelf life of the dried grain 20, the method comprising the steps of collecting, closing, detaching, dispensing, evacuating, flushing, maintaining, measuring, obtaining, opening, removing, repeating, retrieving, testing, turning off, and venting. The obtaining step comprises obtaining a vacuum kiln apparatus 10 for drying the grain 20 to an acceptable moisture level, the apparatus 10 comprises: a support base 30; a wall 40 attached to the support base 30, the wall 40 having a top access opening 50 and a machinery access opening 60 an off-load access opening 190, wherein the wall 40 defines an internal chamber 70; a vacuum pump system 80 in communication with the internal chamber 70; a pressure valve 90 in communications with the internal chamber 70; a top hatch 100 attached to the wall 40, wherein the top hatch 100 is configured to hermetically seal the top access opening 50 of the wall 40; a machinery access hatch attached to the wall 40, wherein the machinery access port 110 is configured to hermetically seal the machinery access opening 60 of the wall 40; an off-load port 200 attached to the wall 40, wherein the off-load port 200 configured to hermetically seal the off-load access opening 190 of the wall 40; a humidity detector 400 configured to detect humidity within the internal chamber 70; a motor 140 mounted within the internal chamber 70; a conveyor system 120 mounted within the internal chamber 70, wherein the conveyor system 120 comprises a belt system 230 coupled to the motor 140 in which the belt system 230 comprises a vented platform 240; a bottom array 130 mounted within the internal chamber 70 of the wall 40, the bottom array 130 configured to deliver grain 20 to the conveyor system 120 and the bottom array 130 has a plurality of perforations 420; a chamber vent valve 150 in communications with the internal chamber 70; an air compressor 160 in communications with the internal chamber 70; an anti-overload baffle 180 mounted within the internal chamber 70 of the wall 40; an air outlet manifold 440 mounted within the internal chamber 70, wherein the air outlet manifold 440 is coupled to the air compressor 160; and a control panel 390 configured to control the chamber vent valve 150, and the air compressor 160.

The opening step comprises opening the top hatch 100 to unseal and to open up the top access opening 50 of the wall 40. The dispensing step comprises dispensing grain 20 into the internal chamber 70 of the apparatus 10 onto the conveyor system 120 so that a portion of the grain 20 is on the vented platform 240 of the belt system 230. The closing step comprises closing the opened top hatch 100 to hermetically seal the top access opening 50 of the wall 40.

The evacuating step comprises evacuating the internal chamber 70 of the apparatus 10 to reduce a pressure within internal chamber 70 while the grain 20 is on the vented platform 240 of the belt system 230 by turning on the vacuum pump system 80. The measuring step comprises measuring the pressure within the internal chamber 70 with the pressure valve 90. The turning off step comprises turning off the vacuum pump system 80 after a reduced pressure within the internal chamber 70 has been reached. The maintaining step comprises maintaining the reduced pressure within the internal chamber 70 for an extended period of time to slowly pull out water from the grain 20. The venting step comprises the internal chamber 70 by opening up the pressure valve 90 to allow ambient air into the internal chamber 70. The flushing step comprises flushing the internal chamber 70 after venting the pressured air into the internal chamber to reduce residual humidity in the internal chamber. The evacuating, measuring, turning off, maintaining, venting and flushing steps can be performed repetitively, or cycled, until a desired final moisture content over time is achieved, once benchmark performance parameters are defined.

The detaching step comprises detaching the off-load port 200 to unseal the off-load access opening 190 and to gain access into the internal chamber 70. The retrieving step comprises retrieving a sample of the grain 20 through the off-load access opening 190. The testing step comprises testing a level of moisture in the retrieved grain 20. The repeating step comprises repeating the steps of evacuating, measuring, turning off, maintaining, elevating, forcing, and venting, when the tested level of moisture in the retrieved grain 20 is above a suitable level. The removing step comprises removing the grain 20 from the internal chamber 70 when the tested level of moisture in the retrieved grain 20 is at or below a suitable level. The collecting step comprises collecting the removed grain 20 in a hopper 430.

As alternative embodiments, the off-loading an repeating steps may be performed and recorded to define benchmark time, pressure and moisture parameters for particular crops and conditions. As another alternative, the off-loading step can comprise a sampling step whereby not all of the grain is off-loaded, the sample determining if further cycles on grain remaining resident is necessary.

The method may also further comprise the steps of entering, exiting, performing, resealing, and unsealing. The unsealing step comprises unsealing the machinery access hatch to unseal and open up the machinery access opening 60 of the wall 40. The entering step comprises entering into the internal chamber 70 through the machinery access hatch when the machinery access opening 60 is unsealed. The performing step comprises performing maintenance on the motor 140 when the machinery access opening 60 is unsealed. The exiting step comprises exiting from the internal chamber 70 through the machinery access hatch when the machinery access opening 60 is unsealed. The resealing step comprises resealing the machinery access hatch to hermetically seal the machinery access opening 60 of the wall 40.

With respect to the specific embodiments illustrating the apparatus, while these have been described generally, with alternative or optional features, the specific drawings can be now described.

Figure 1C:
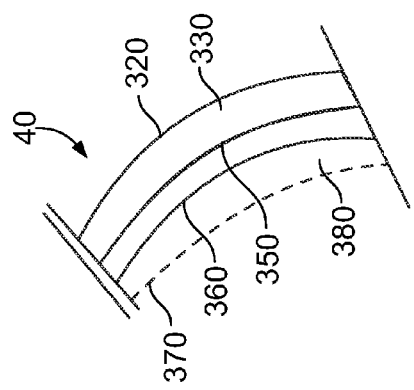
FIG. 1C is a cross sectional side view of the wall construction of the first embodiment of a vertical embodiment of the vacuum kiln apparatus.
Figure 1A:
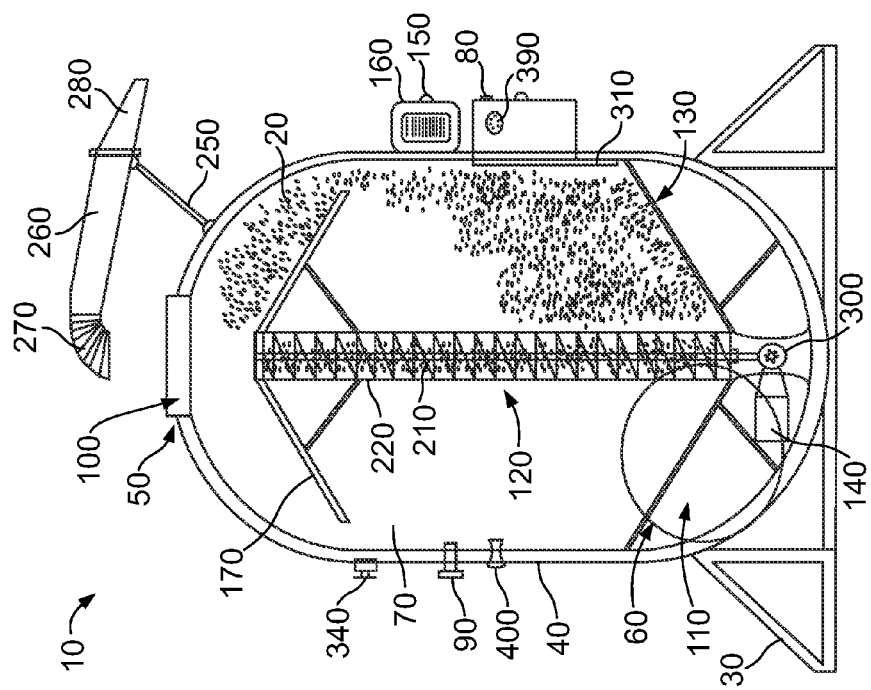
FIG. 1A is a cross sectional side view of a first embodiment of a vertical embodiment of the vacuum kiln apparatus.

FIG. 1A depicts a cross sectional view of a vertical alignment embodiment of the vacuum kiln apparatus 10 comprising a support base 30, a wall 40, a vacuum pump system 80, a pressure valve 90, a top hatch 100, a machinery access hatch 110, a conveyor system 120, a top baffle array 170, a bottom array 130, a motor 140, a chamber vent valve 150, a plenum valve, a pressure valve, a heater 310, a control panel 390, an air compressor 160, a support arm 250, a discharge conduit 260. The wall 40 is shown attached to the support base 30 in which the wall 40 has a top access opening 50 and a machinery access opening 60 such that the wall 40 defines an internal chamber 70. The vacuum pump system 80 is shown in communication with the internal chamber 70. The pressure valve 90 is shown in communications with the internal chamber 70. The top hatch 100 is shown hermetically sealing the top access opening 50 of the wall 40. The machinery access hatch is shown hermetically sealing the machinery access opening 60 of the wall 40. The conveyor system 120 is shown as an Archimedes screw conveyor system 120 mounted vertically within the internal chamber 70. The Archimedes screw conveyor system 120 is shown comprising a helical screw 210 coupled to the motor 140 and a sheath 220 surrounding the helical screw 210. The bottom array 130 is shown mounted within the internal chamber 70 of the wall 40 so that the bottom array 130 is configured to deliver grain 20 to the conveyor system 120. The motor 140 is shown coupled to the conveyor system 120 and mounted within the internal chamber 70. The chamber vent valve 150 shown is in communications with the internal chamber 70. The air compressor 160 is shown in communications with the internal chamber 70.

FIG. 1B depicts a cross sectional view of the vacuum kiln apparatus 10 comprising the sealing adaptor 290 coupled to the top access opening 50 with the top hatch 100 hinged away. The sealing adaptor 290 is also shown coupled to the inner end 270 of the discharge conduit 260 and to the conveyor system 120 for receiving grain 20 from the conveyor system 120

FIG. 1C depicts a cross sectional view of the wall 40 comprising an outer skin 320, a plenum 330, a plenum valve 340 in communications with the plenum 330, an insulative layer 350, and an inner skin 360. The insulative layer 350 and the outer skin 320 define the plenum 330 therebetween. The wall 40 is also shown comprising a screen 370 secured to the inner skin 360 and a gap 380 defined between the screen 370 and the inner skin 360.

Figure 2:
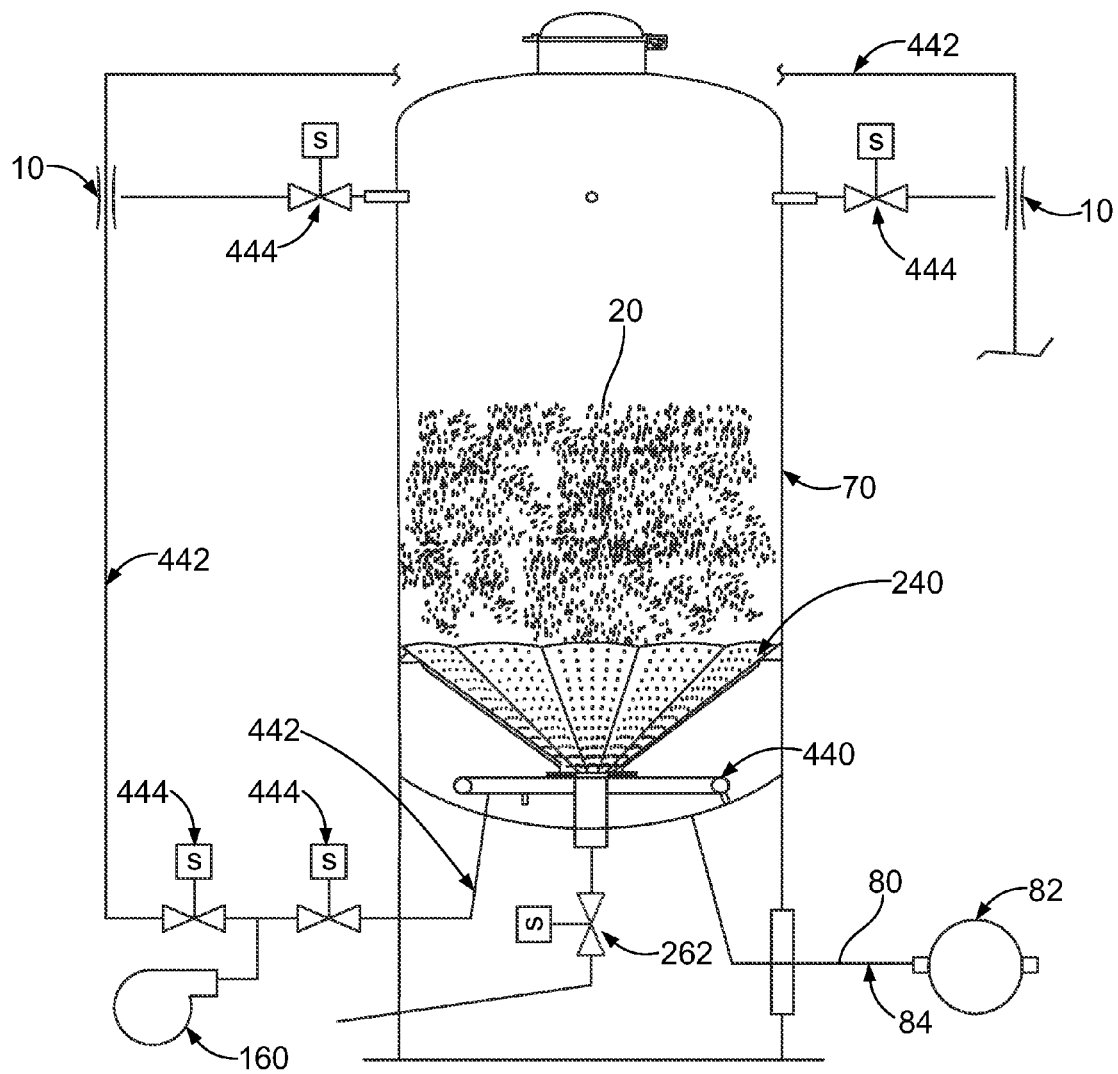
FIG. 2 is a cross sectional side view of a second embodiment of a vertical embodiment of the vacuum kiln apparatus.

FIG. 2 depicts an alternative vertical embodiment of the vacuum dryer 10. Vacuum pump system 80, uses vacuum pump 82 connected through vacuum lines 84. Chamber 70 is subject to vacuum and selectively to high pressure air pressurized by compressor 160 to manifold 440 through air lines or conduits 442. Solenoid valves 444 control closing or opening conduits 442. Air passage is enhanced by supporting grain 20 on vented platform 240. Venturi conduits 446 can utilize pressurized airflow to impart a relative vacuum. Grain 20 is removed through discharge valve or port 262.

Figure 3:
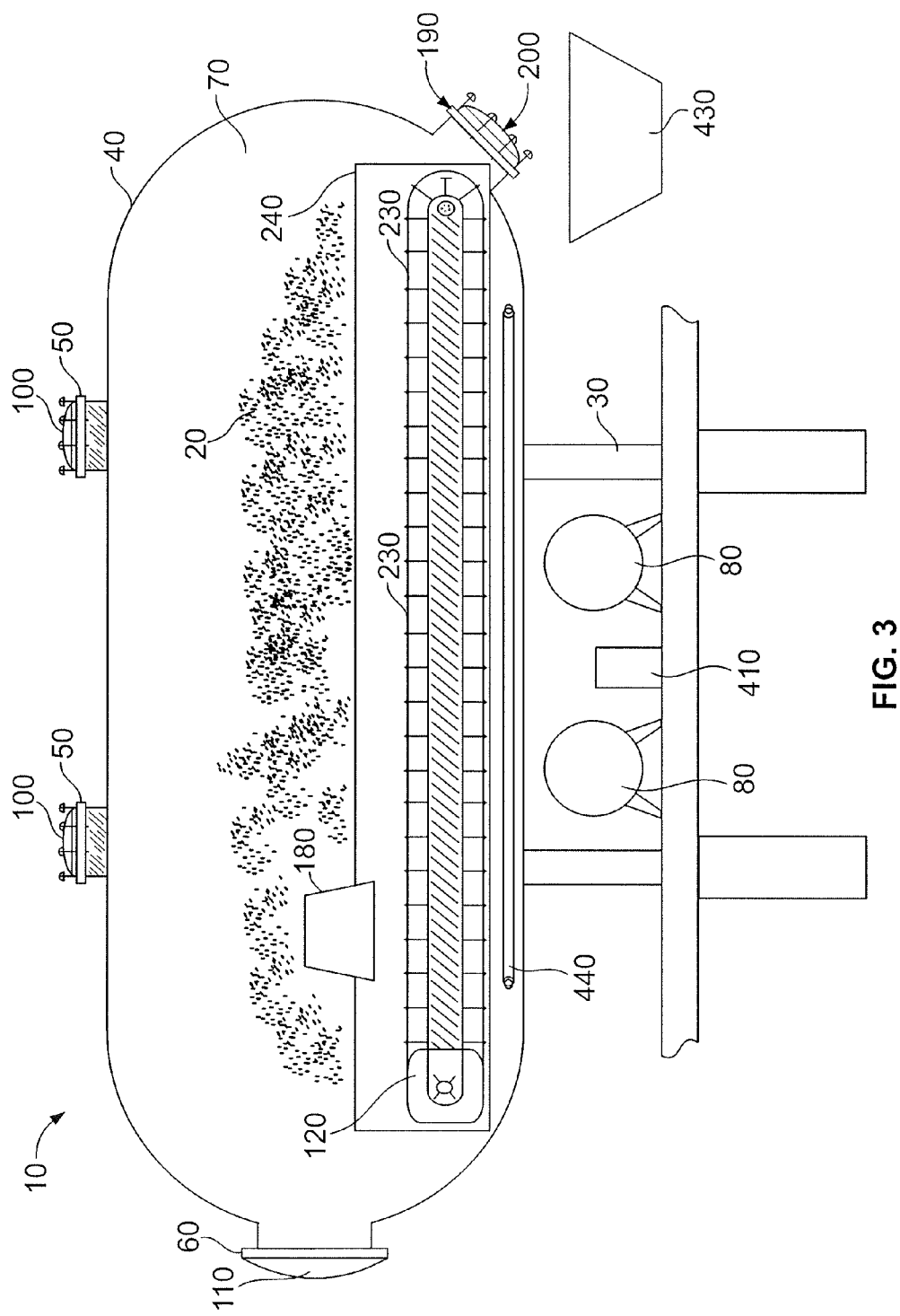
FIG. 3 is a cross sectional side view of a horizontal embodiment the present vacuum kiln apparatus.

FIG. 3 depicts a cross sectional side view of a horizontally aligned vacuum kiln apparatus 10 comprising a support base 30, a wall 40, a vacuum pump system 80, a top hatch 100, a machinery access hatch 110, an off-load port 200, a conveyor system 120, an anti-overload baffle 180, a drying unit 410, and an air outlet manifold 440.

Figure 4:
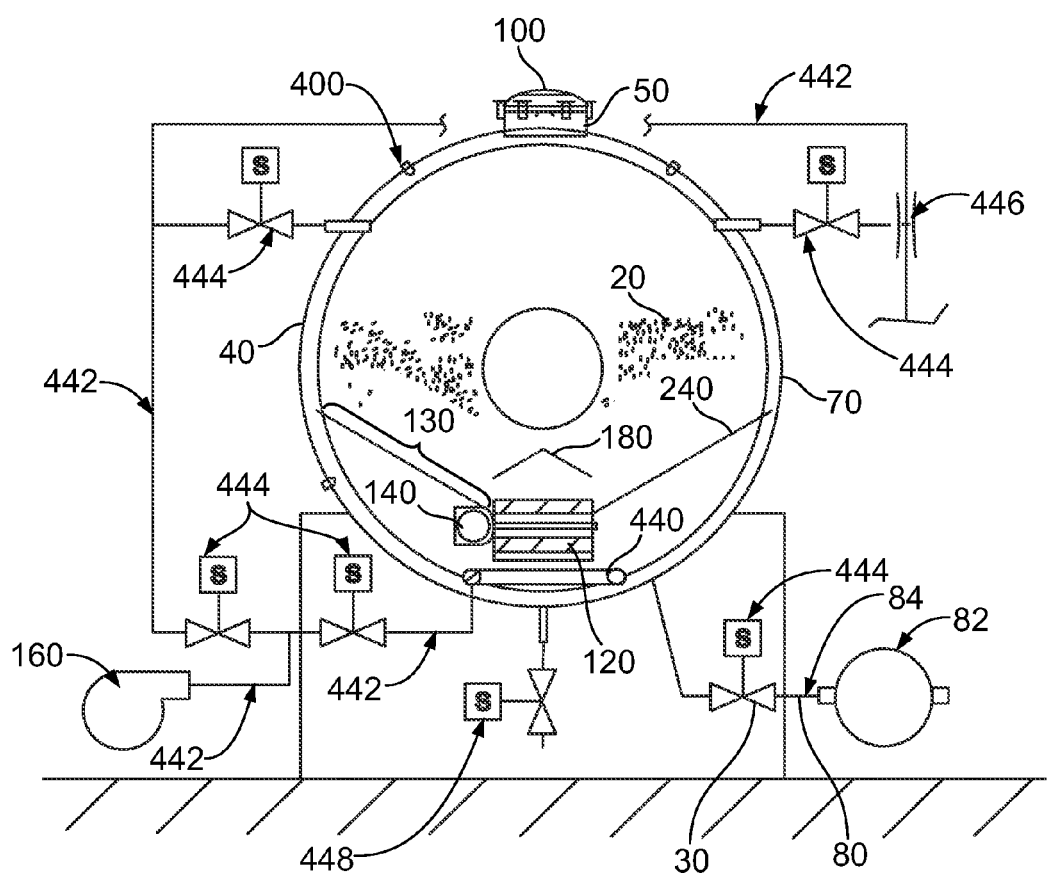
FIG. 4 is a cross sectional front view of the horizontal embodiment of the vacuum kiln apparatus.

FIG. 4 depicts a cross sectional side view of a horizontally aligned vacuum kiln apparatus 10 comprising a wall 40 having a internal chamber 70, a top hatch 100 sealing the top access opening 50, a machinery access port sealing the bottom access opening 60, a conveyor system 120 composed of a belt system 230 with a vented platform 240, an anti-overload baffle 180 mounted about the conveyor system 120, and an air outlet manifold 440 underneath the conveyor system 120.

The foregoing apparatus can be used to perform the method steps. In the course of developing the invention, testing was performed using laboratory/workshop sized equipment and is described in the following examples.

EXAMPLE 1

12 Hour Vacuum No Air Purge

Corn grain, initially having a moisture content of 20.1%, was placed in the vacuum kiln. The pressure inside the vacuum kiln was then reduced by 27.5 inches of mercury and the temperature was maintained at approximately 70° F. After 12 hours of exposure to the vacuum, the corn grain sample was removed and found to have a moisture content of 12.1%. The dried corn grain did not exhibit any cracking.

EXAMPLE 2

Two 12 Hour Vacuum Exposures with Air Purges

Corn grain, initially having a moisture content of 24.5%, was placed in the vacuum kiln. The pressure inside the vacuum kiln was then reduced by about 27 inches of mercury and the temperature was maintained at about 71° F. After 12 hours of exposure to the vacuum, the vacuum kiln was purged with air at approximately 120 psi and then opened. Afterwards, the corn grain was found to have a moisture content of about 18.0%. The corn grain was again subjected to a reduced pressure of about 27.6 inches of mercury in the vacuum kiln and maintained isothermally at about 71° F. After 12 another hours, the vacuum kiln was again purged with air at approximately 120 psi and then opened. The subsequently dried corn grain was found to have a final moisture content of about 14.9%.

EXAMPLE 3

Two 8 Hour Vacuum Exposures with Air Purges

Corn grain, initially having a moisture content of 20.4%, was placed in the vacuum kiln. The pressure inside the vacuum kiln was then reduced by about 27 inches of mercury and the temperature was maintained at about 67° F. After 8 hours of exposure to the vacuum, the vacuum kiln was purged with air at approximately 120 psi and then opened. The pressure inside the vacuum kiln was again reduced by about 27 inches of mercury and the temperature was maintained at about 67° F. After another 8 hours of exposure to the vacuum, the vacuum kiln was again purged with air at approximately 120 psi and then opened. The subsequently dried corn grain was found to have a final moisture content of about 14.9%.

EXAMPLE 4

Two 12 Hour Vacuum Exposures with Air Purges

Corn grain, initially having a moisture content of 20.1%, was placed in the vacuum kiln. The pressure inside the vacuum kiln was then reduced by about 27 inches of mercury and the temperature was maintained at about 67° F. After 12 hours of exposure to the vacuum, the vacuum kiln was purged with air at approximately 120 psi and then opened. At this stage, the corn grain was found to have a moisture content of about 15.9%. The pressure inside the vacuum kiln was again reduced by about 27 inches of mercury and the temperature was maintained at about 68° F. After another 12 hours of exposure to the vacuum, the vacuum kiln was again purged with air at approximately 120 psi and then opened. The subsequently dried corn grain was found to have a final moisture content of about 14.3%.

While preferred embodiments of the vacuum kiln apparatus have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of removing excess moisture in grain to extend a shelf life of the dried grain, the method comprising:
   obtaining a vacuum kiln apparatus for drying the grain to an acceptable moisture level, the apparatus comprising: a support base; a wall attached to the support base, the wall having a top access opening, a machinery access opening, and an off-load access opening, wherein the wall defines an internal chamber; a vacuum pump system in communication with the internal chamber; a pressure valve in communications with the internal chamber; a top hatch attached to the wall, wherein the top hatch is configured to hermetically seal the top access opening of the wall; a machinery access hatch attached to the wall, wherein the machinery access port is configured to hermetically seal the machinery access opening of the wall; an off-load port attached to the wall, wherein the off-load port configured to hermetically seal the off-load access opening of the wall; a humidity detector configured to detect humidity within the internal chamber; a motor mounted within the internal chamber; a conveyor system mounted within the internal chamber, wherein the conveyor system comprises a belt system coupled to the motor in which the belt system comprises a vented platform; a bottom array mounted within the internal chamber of the wall, the bottom array configured to deliver grain to the conveyor system and the bottom array has a plurality of perforations; a chamber vent valve in communications with the internal chamber; an air compressor in communications with the internal chamber; an anti-overload baffle mounted within the internal chamber of the wall; an air outlet manifold mounted within the internal chamber, wherein the air outlet manifold is coupled to the air compressor; and a control panel configured to control the chamber vent valve, and the air compressor;
   opening the top hatch to unseal and to open up the top access opening of the wall;
   dispensing grain into the internal chamber of the apparatus onto the conveyor system so that a portion of the grain is on the vented platform of the belt system;
   closing the opened top hatch to hermetically seal the top access opening of the wall;
   evacuating the internal chamber of the apparatus to reduce a pressure within internal chamber while the grain is on the vented platform of the belt system by turning on the vacuum pump system;
   measuring the pressure within the internal chamber with the pressure valve;
   turning off the vacuum pump system after a reduced pressure within the internal chamber has been reached;
   maintaining the reduced pressure within the internal chamber for an extended period of time to slowly pull out water from the grain;
   venting the internal chamber by opening up the pressure valve to allow ambient air into the internal chamber;
   flushing the internal chamber after venting the pressured air into the internal chamber to reduce residual humidity in the internal chamber;
   detaching the off-load port to unseal the off-load access opening and to gain access into the internal chamber;
   retrieving a sample of the grain through the off-load access opening;
   testing a level of moisture in the retrieved grain;
   repeating the steps of evacuating, measuring, turning off, maintaining, venting, and flushing, when the tested level of moisture in the retrieved grain is above a suitable level;
   removing the grain from the internal chamber when the tested level of moisture in the retrieved grain is at or below a suitable level; and
   collecting the removed grain in a hopper.

2. The method of claim 1, further comprising:
   unsealing the machinery access hatch to unseal and open up the machinery access opening of the wall;
   entering into the internal chamber through the machinery access hatch when the machinery access opening is unsealed:
   performing maintenance on the motor when the machinery access opening is unsealed;
   exiting from the internal chamber through the machinery access hatch when the machinery access opening is unsealed; and
   resealing the machinery access hatch to hermetically seal the machinery access opening of the wall.

* * * * *